United States Patent
Schroeder et al.

(10) Patent No.: US 9,245,087 B1
(45) Date of Patent: Jan. 26, 2016

(54) METHODS, APPARATUS AND SYSTEM FOR REDUCTION OF POWER CONSUMPTION IN A SEMICONDUCTOR DEVICE

(71) Applicant: GLOBALFOUNDRIES INC., Grand Cayman (KY)

(72) Inventors: Uwe Paul Schroeder, Benicia, CA (US); Sushama Davar, Santa Clara, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/473,986

(22) Filed: Aug. 29, 2014

(51) Int. Cl.
   G06F 17/50      (2006.01)
   H01L 29/78      (2006.01)
   H01L 27/088     (2006.01)

(52) U.S. Cl.
   CPC ........ *G06F 17/5081* (2013.01); *G06F 17/5031* (2013.01); *H01L 27/0886* (2013.01); *H01L 29/785* (2013.01)

(58) Field of Classification Search
   CPC .......... H01L 29/66795; H01L 21/823431; H01L 27/0886; H01L 27/1211; H01L 29/66545; H01L 29/785; G06F 17/5081; G06F 17/5031
   See application file for complete search history.

(56) References Cited

U.S. PATENT DOCUMENTS

2013/0009249 A1*   1/2013   Basker et al. ............... 257/368

* cited by examiner

*Primary Examiner* — Yasser A Abdelaziez
*Assistant Examiner* — Farun Lu
(74) *Attorney, Agent, or Firm* — Williams Morgan, P.C.

(57) ABSTRACT

At least one method, apparatus and system disclosed herein involves performing power reduction process on a FinFET device. A first design is provided. The first design comprises a process mask definition, a FinFET device that comprises a plurality of fins characterized by said process mask, and a timing requirement relating to an operation of said FinFET device. A timing parameter of said operation of said FinFET device is determined. Based upon said timing parameter, a determination is made as to whether a drive capability of said FinFET device is above a level required to maintain said timing requirement. The process mask is modified for reducing at least one of said fins in response to said determining that said drive capability is above said level required to maintain said timing requirement.

20 Claims, 10 Drawing Sheets

METHODS, APPARATUS AND SYSTEM FOR REDUCTION OF POWER CONSUMPTION IN A SEMICONDUCTOR DEVICE

BACKGROUND OF THE INVENTION

1. Field of the Invention

Generally, the present disclosure relates to the manufacture of sophisticated semiconductor devices, and, more specifically, to various methods of reducing power consumption in semiconductor devices, such as FINFET devices.

2. Description of the Related Art

The fabrication of advanced integrated circuits, such as CPU's, storage devices, ASIC's (application specific integrated circuits) and the like, requires the formation of a large number of circuit elements in a given chip area according to a specified circuit layout, wherein so-called metal oxide field effect transistors (MOSFETs or FETs) represent one important type of circuit element that substantially determines performance of the integrated circuits. A FET is a device that typically includes a source region, a drain region, a channel region that is positioned between the source region and the drain region, and a gate electrode positioned above the channel region. Current flow through the FET is controlled by controlling the voltage applied to the gate electrode. If a voltage that is less than the threshold voltage of the device is applied to the gate electrode, then there is no current flow through the device (ignoring undesirable leakage currents, which are relatively small). However, when a voltage that is equal to or greater than the threshold voltage of the device is applied to the gate electrode, the channel region becomes conductive, and electrical current is permitted to flow between the source region and the drain region through the conductive channel region.

To improve the operating speed of FETs, and to increase the density of FETs on an integrated circuit device, device designers have greatly reduced the physical size of FETs over the years. More specifically, the channel length of FETs has been significantly decreased, which has resulted in improving the switching speed of FETs. However, decreasing the channel length of a FET also decreases the distance between the source region and the drain region. In some cases, this decrease in the separation between the source and the drain makes it difficult to efficiently inhibit the electrical potential of the channel from being adversely affected by the electrical potential of the drain. This is sometimes referred to as a so-called short channel effect, wherein the characteristic of the FET as an active switch is degraded.

In contrast to a planar FET, which has a planar structure, there are so-called 3D devices, such as an illustrative FinFET device, which is a 3-dimensional structure. More specifically, in a FinFET, a generally vertically positioned, fin-shaped active area is formed and a gate electrode encloses both of the sides and the upper surface of the fin-shaped active area to form a tri-gate structure so as to use a channel having a 3-dimensional structure instead of a planar structure. In some cases, an insulating cap layer, e.g., silicon nitride, is positioned at the top of the fin and the FinFET device only has a dual-gate structure.

FinFET designs use "fins" that may be formed on the surface of a semiconductor wafer using selective-etching processes. The fins may be used to form a raised channel between the gate and the source and drain of a transistor. The gate is then deposited such that it wraps around the fin to form a trigate structure. Since the channel is extremely thin, the gate would generally have a greater control over the carriers within. However, when the transistor is switched on, the shape of the channel may limit the current flow. Therefore, multiple fins may be used in parallel to provide greater current flow for increased drive strength.

Figure 1:
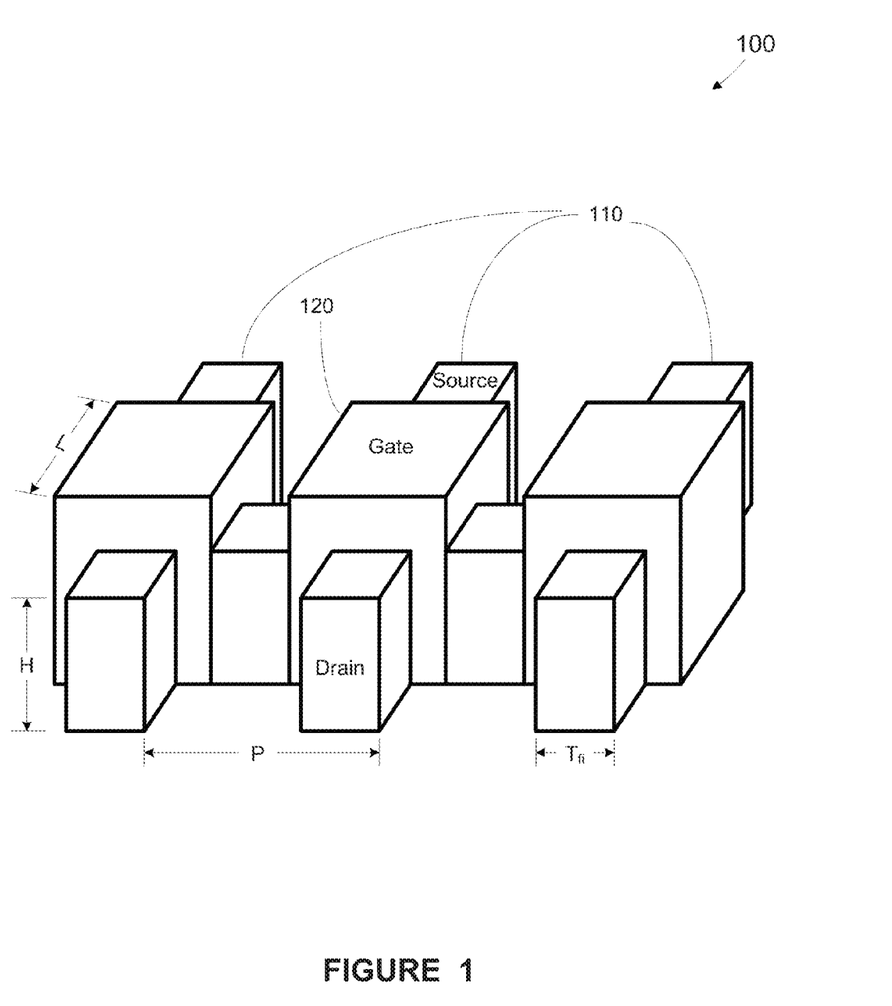
FIG. 1 illustrates a stylized cross-sectional depiction of a state-of-the-art FinFET device.

FIG. 1 illustrates a stylized cross-sectional depiction of a state-of-the-art FinFET device. A FinFET device 100 illustrated in FIG. 1 comprises a plurality of "fins" 110. The semiconductor device may be position to a vertical orientation, creating one or more fins 110. The source and drain of the FinFET are placed horizontally along the fin. A high-k metal gate 120 wraps over the fin, covering it on three sides. The gate 120 defines the length of the FinFET device. The current flow occurs along an orthogonal crystal plane in a direction parallel to the plane of the semiconductor wafer. The electrically significant height of the fin (labeled H) is typically determined by the amount of oxide recess in the fin reveal step and hence is constant for all fins 110.

The thickness of the fin (labeled $T_{fi}$) determines the short channel behavior of the transistor device and is usually small in comparison with the height H of the fin 110. The pitch (labeled P) of the fins is determined by lithographic constraints and dictates the wafer area to implement the desired device width. A small value of the pitch P and a large value of the height H enable a better packing of the devices per square area resulting in a denser design, or more efficient use of silicon wafer area.

Unlike a planar FET, in a FinFET device, a channel is formed perpendicular to a surface of the semiconducting substrate so as to reduce the depletion width under the channel and thereby reduce so-called short channel effects. Also, in a FinFET, the junction capacitance at the drain region of the device is greatly reduced, which tends to reduce at least some short channel effects. However, FinFET devices still exhibit some performance-limiting characteristics. One such characteristic that is detrimental to all forms of semiconductor devices, both FinFETs and planar FETs, is off-state leakage currents. Ideally, off-state leakage current is minimized to increase device performance.

FinFET technology has emerged as a solution to reduce problems associated with leakage currents, gate leakage, excessive power consumption, etc. Compared to conventional MOSFET technology, FinFET technology can offer superior short channel effects. For example, FinFET technology may allow for more efficient flow of carriers through the channel underneath the gate electrode, therefore, efficiently turning off the FinFET transistor.

One problem associated with the FinFET device is that the freedom to select the drive strength is reduced. The drive strength can only be improved during layout by adding more fins. Therefore, the effective width of the FinFET device may become quantized. Generally, at least two fins are formed in FinFET devices, sometimes more. Due to the dense nature of modern semiconductor devices, a large number of fins may be present. The fins may cause high active power-consumption.

In a FINFET, the device-width quantum is determined by the height H of the fin, with each fin providing 2H of device width. With such quantization in device width, it becomes more difficult to achieve desired beta ratios using FinFETs, which places a constraint on the power-performance tradeoffs associated with the designs.

State-of-the-art solutions include fine-tuning various blocks formed on a semiconductor device, such as a FINFET device for lower power. However, these state-of-the-art solutions may require redesigning the layout of the semiconductor device after an analysis of the performance-power tradeoff parameters is performed. The redesign cycle would generally cause delays and expense during the manufacturing and testing processes. For example, an estimate of the amount of current flow (saturation drain current) may be made during the design stage of a semiconductor device. Based upon this estimate, a number of fins may be designed into the FinFET device. However, after the product design, a better understanding of the floor plan and the routing of the device is obtained, which leads to a better estimate of the amount of current flow. Upon this new, more accurate estimate, it may be apparent that the number of fins that were used in the design may be excessive in some portions of the semiconductor device, thereby causing needless power consumption in the semiconductor device. However, changing the design or the product to correct this problem at this stage may be time consuming and costly.

The present disclosure may address and/or at least reduce one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure is directed to various methods, apparatus and system for performing a power reduction process on a FinFET device. A first design is provided. The first design comprises a process mask definition, a FinFET device that comprises a plurality of fins characterized by said process mask, and a timing requirement relating to an operation of said FinFET device. A timing parameter of said operation of said FinFET device is determined. Based upon said timing parameter, a determination is made as to whether a drive capability of said FinFET device is above a level required to maintain said timing requirement. The process mask is modified for reducing at least one of said fins in response to said determining that said drive capability is above said level required to maintain said timing requirement.

BRIEF DESCRIPTION OF THE DRAWINGS

The disclosure may be understood by reference to the following description taken in conjunction with the accompanying drawings, in which like reference numerals identify like elements, and in which.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Embodiments herein provide for reducing at least a portion of total power consumption of a semiconductor device, e.g., a FinFET device. For example, embodiments herein may be used to reduce the static power consumption and/or the active power consumption of a semiconductor device. In one embodiment, a post-design change may be made after power consumption evaluation of a design. These design changes may be made without requiring changing the layout, moving circuitry, or otherwise re-designing the device. In other embodiments, fully developed, operational devices (beta devices or production devices) may be modified without requiring changing the layout, moving circuitry, or otherwise re-designing the device.

Embodiments herein call for selectively altering one or more fins of a FinFET device without altering the performance below the design standard. For example, a post-design analysis may reveal that maximum current drive capabilities provided by one or more fins of the FinFET may not be required to meet the design standard for performance. In this case, one or more fins may be selectively eliminated from the design. This elimination of the fins may be performed by manipulating one or more masks of one or more process steps. For example, the fin cut (FP) mask may be modified to reduce the amount of fins of a FinFET sufficiently to reduce power consumption, but yet maintain sufficient performance. In other embodiments, the fin mandrel (FN) mask may be modified to reduce an amount of fins of a FinFET sufficiently to reduce power consumption, but yet maintain sufficient performance (e.g., timing requirements).

Figure 2:
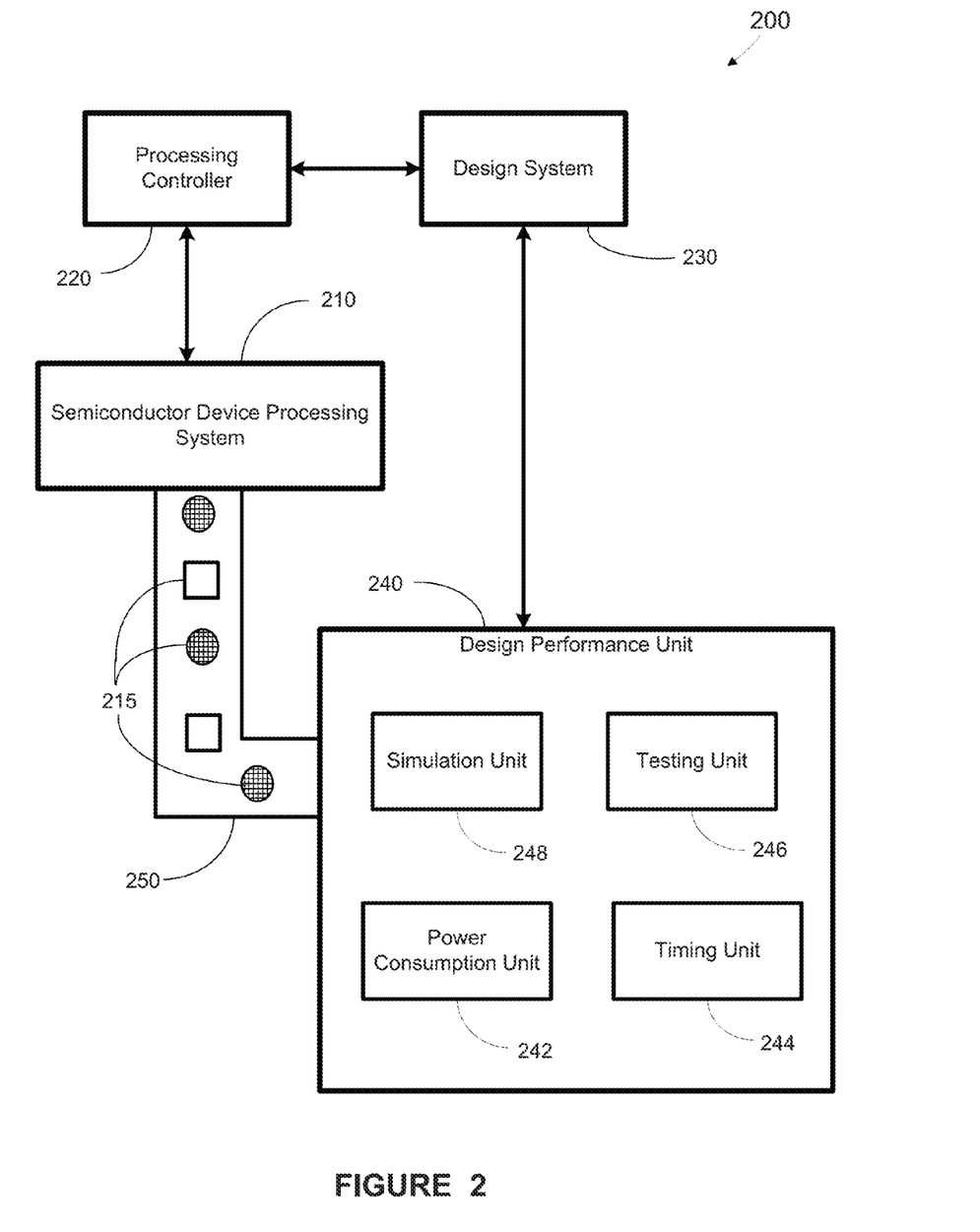
FIG. 2 illustrates a system for performing the power consumption reduction process, in accordance with embodiments herein.

Turning now to FIG. 2, a system for performing the power consumption reduction process, in accordance with embodiments herein, is illustrated. The system 200 may comprise a semiconductor device processing system 210. The semiconductor device processing system 210 may comprise various processing stations, such as etch process stations, photolithography process stations, CMP process stations, etc. One or more of the processing steps performed by the processing system 210 may be controlled by the processing controller 220. The processing controller 220 may be a workstation computer, a desktop computer, a laptop computer, a tablet computer, or any other type of computing device comprising one or more software products that are capable of controlling processes, receiving process feedback, receiving test results data, performing learning cycle adjustments, performing process adjustments, etc.

The semiconductor device processing system 210 may produce integrated circuits on a medium, such as silicon wafers. The processing system 210 may provide processed integrated circuits/devices 215 on a transport mechanism 250, such as a conveyor system. In some embodiments, the conveyor system may be sophisticated clean room transport systems that are capable of transporting semiconductor wafers. In one embodiment, the semiconductor device processing system 210 may comprise a plurality of processing sets, e.g., the 1$^{st}$ process step, the 2$^{nd}$ process set, etc., as described above. In some embodiments, the items labeled "215" may represent individual wafers, and in other embodiments, the items 215 may represent a group of semiconductor wafers, e.g., a "lot" of semiconductor wafers.

The system 200 may comprise a design system 230 for facilitating the design of integrated circuit devices. The processing steps performed on the semiconductor wafers 215 may be based upon specifications provided by the design system 230. The design system 230 may be an automated system, a manually controlled system, and/or a combination of both. The design system 230 may be controlled by a user to place various macros, modules, circuitry, routing components, etc., in order to design an integrated circuit device that performs predetermined functions within predetermined performance parameters. Many of these components may be selected from various libraries that are available to, or are a part of, the design system 230.

The system 200 may also comprise a design performance unit 240 that is capable of determining various performance parameters of processed semiconductor device 215 and/or designs of integrated circuit devices based upon simulations. Among the performance parameters analyzed by the design performance unit 240 may include power consumption parameters, speed of operations, reliability, and the like, etc.

In some embodiments, the design system 230 and the design performance unit 240 may be part of a single design unit.

The design performance unit 240 may comprise a power consumption unit 242, timing unit 244, a testing unit 246, and a simulation unit 248. One or more blocks of the design performance unit 240 may be separate modules, or may overlap partially or fully. Further, one or more of the blocks of the design performance unit 240 may be software units, hardware units, firmware units, and/or any combination thereof.

The simulation unit 248 is capable of performing various types of simulations for determining the potential performance of a design of an integrated circuit device. For example, the maximum operating frequency can be extracted from SPICE model simulations. The simulation unit 248 may provide various performance measurement data, such as data indicative of speed of operation, current flow, power consumption, etc. Similarly, the testing unit 246 may perform one or more tests on a manufactured integrated circuit device, e.g., a processor, a transistor, a capacitor, a memory device, a communication device, etc. Based upon the tests performed by the testing unit 246, the design performance unit 240 is capable of providing various performance measurement data.

The power consumption unit 242 is capable of determining the static and/or the active power consumption of devices of an integrated circuit being designed, or being manufactured. Based upon data from the simulation unit 248 and/or the testing unit 246, the power consumption unit 242 may determine various static and active power consumption of the device or design under analysis.

The timing unit 244 is capable of performing various timing analysis of the circuitry of the design and/or the integrated circuit device being tested. In one embodiment the timing analysis maybe based upon data from the simulation unit 248 and/or the testing unit 246. The timing unit 244 may perform a static timing analysis (STA). The static timing analysis may include analysis of the timing of a circuit operation in order to determine the amount of timing slack or excess time available for performing a particular operation. For example, an analysis may be performed in order to determine whether the timing capabilities are such that an excess amount of time is available when performing a particular task by a circuit in the integrated circuit device. For example, based upon data from the simulation unit 248 or the testing unit 246, a determination maybe made that a particular data transfer is would be performed at 8 ns. However the performance requirement that was used in the design of the circuitry may only require such a transfer to be completed within a 10 ns window. Therefore an excess time or a timing slack of 2 ns is available with respect to performing this particular data transfer. Accordingly this timing excess maybe used to perform various power consumption reduction processes and maintain the minimum performance requirements, as described in further details below.

The results from the analyses performed by the design performance unit 248 maybe fed-back to the design system 230. This feedback data maybe use to perform further design modifications or the power reduction processes described herein. Moreover, the changes made by the design system 230 based upon this feedback may be provided to the processing controller 220. In one embodiment, the feedback to the processing controller 220 may not be on an immediate, wafer-to-wafer basis, but may be based upon a lot-to-lot basis. The design performance unit 240 may also be capable of determining a change from one wafer to another within a lot. Based upon the feedback, the processing controller 220 may modify one or more operations performed by the semiconductor device processing system to 210 in order to modify the operations of the integrated circuit devices to conform to the performance requirement, while providing lower power consumption.

Figure 3:
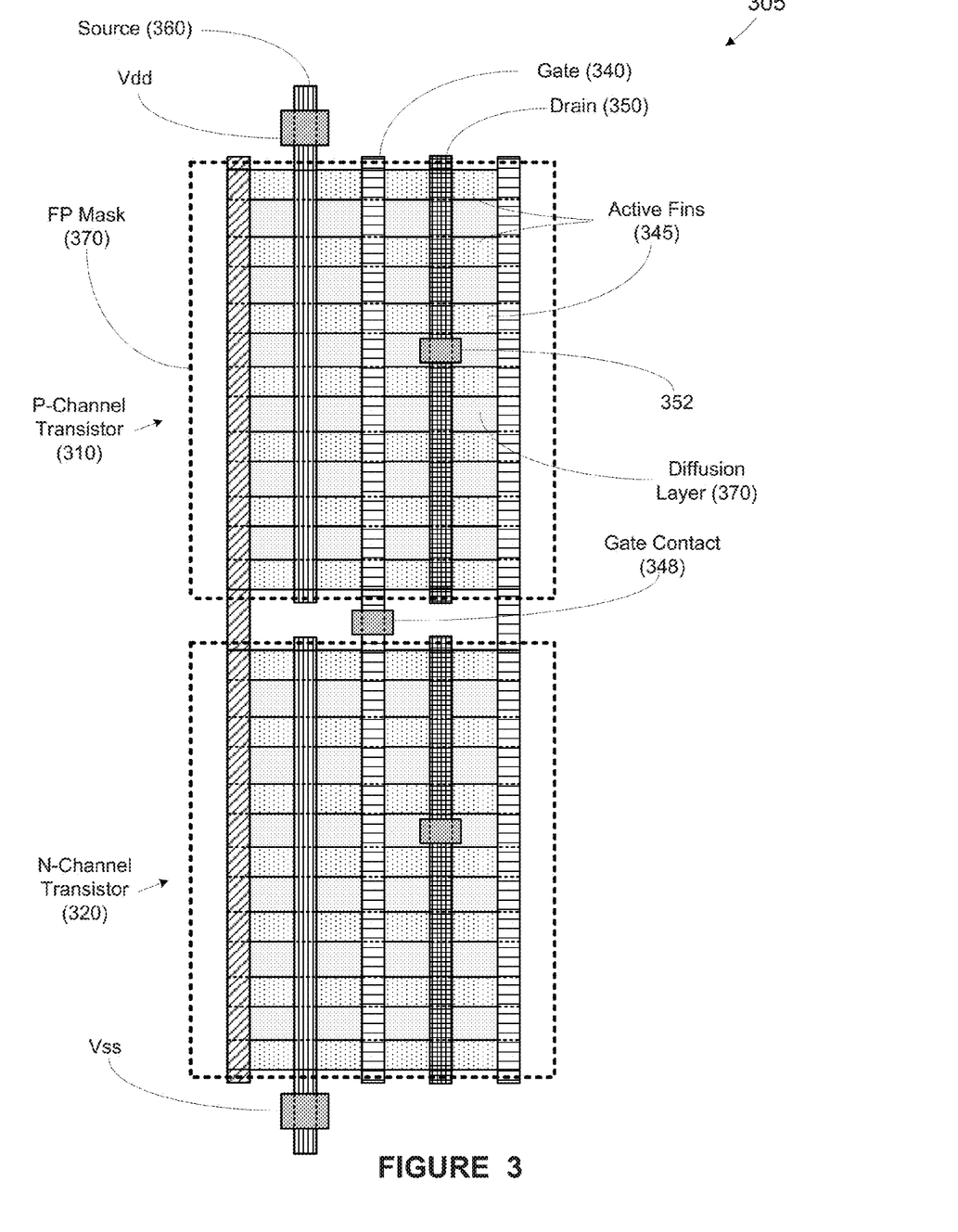
FIG. 3 illustrates a stylized diagram of an fin cut (FP) mask layout of a FinFET device.

Turning now to FIG. 3, a stylized diagram of an FP mask layout of a FinFET device is illustrated. The FinFET device 305 of FIG. 3 comprises a P-channel FinFET 310 and an N-channel FinFET 320. For ease of illustration, the description is directed more towards the P-channel FinFET 310, but the concepts described herein may also apply to the N-channel FinFET 320.

The FinFET 310 comprises a gate portion 340, a drain portion 350, and a source portion 360 formed on a diffusion layer 370 to form a transistor. The source 360 is coupled to in the P-channel FinFET 310, while the source 360 of the N-channel FinFET 320 is coupled to $V_{ss}$. The FinFET 310 also comprises a plurality of active fins 345 that are capable of driving current through the transistor. The drain portion 350 is coupled to one of the active fins 345 at location 352. The gate portion 340 is coupled to a contact 348, which may be coupled to one or more metal layers in the FinFET 310.

In the example of FinFET 310, there are seven active fins 345. The larger the amount of fins 345, the larger the amount of current that can be driven by the FinFET 310. Therefore, the saturation drain current ($i_{d(sat)}$) of the FinFET 310 with a large amount of fins 345 is high. Moreover, leakage current of the FinFET 310 comprising seven fins 345 may be high during inactive time periods. This may cause the static power consumption of the FinFET 310 to be relatively high. Therefore, a reduction of the number of fins 345 may be performed in such a manner that performance requirements mandated by the design are preserved.

During formation of the fins 345 on the FinFET 310, an FP mask 370 is used to preserve the fins 345 in the fin patterning process. In this manner, all seven fins 345 of the FinFET 310 are preserved. Embodiments herein provide for selectively reducing the amount of fins of the FinFET 310. In some cases, the high amount of drive current provided by the seven fins 345 of the FinFET 310 is required to meet the timing performance requirement of the design. However, in other cases, after simulation or test analysis, it may be revealed that the full drive capacity provided by the seven fins 345 of FinFET 310 may not be required to meet the timing performance requirement mandated by the design. In this case, during processing, the FP mask may be manipulated to selectively remove one or more fins 345 without affecting the overall layout and design of the semiconductor device.

Figure 4:
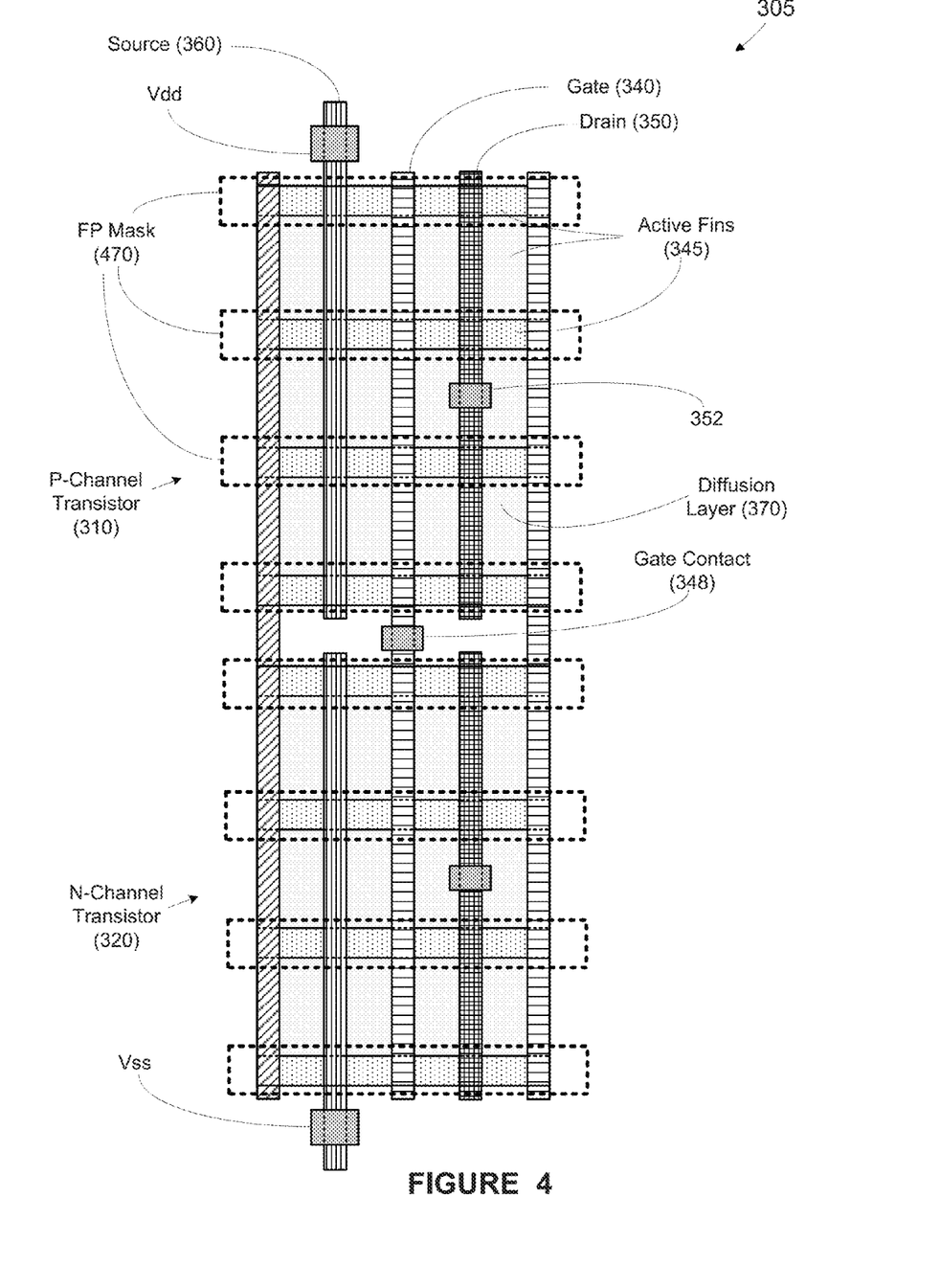
FIG. 4 illustrates a stylized diagram of a layout of a FinFET device comprising a reduced amount of fins, in accordance with a first embodiment.

FIG. 4 illustrates a stylized diagram of a layout of a FinFET device comprising a reduced amount of fins, in accordance with a first embodiment. Referring simultaneously to FIGS. 3 and 4, FIG. 4 illustrates a modified set of FP masks 470. In one embodiment, data from the design performance unit 240 may indicate that based on a state timing analysis, an excessive amount of time (i.e., timing slack) is available for meeting performance requirements. In this case, a determination may be made to reduce the number of active fins 345 from seven active fin 345 (FIG. 3) to four active fins 345 (FIG. 4). The reduction of the active fins is made in such a manner that sufficient current drive capabilities remain to ensure mandated performance requirements.

In order to reduce the number of active fins from seven to four fins, in one embodiment, four individual FP mask shapes 470 that are just large enough to preserve four fins are provided. This allows three intermediary fins to be removed by during the fin patterning process. That is, the FP mask 345 of FIG. 3 may be slotted in such a manner that only four active fins 345 are preserved in the fin patterning process. The number of fins that are selected to remain post fin patterning process is generally tailored to power requirement to meet performance parameters.

Figure 5:
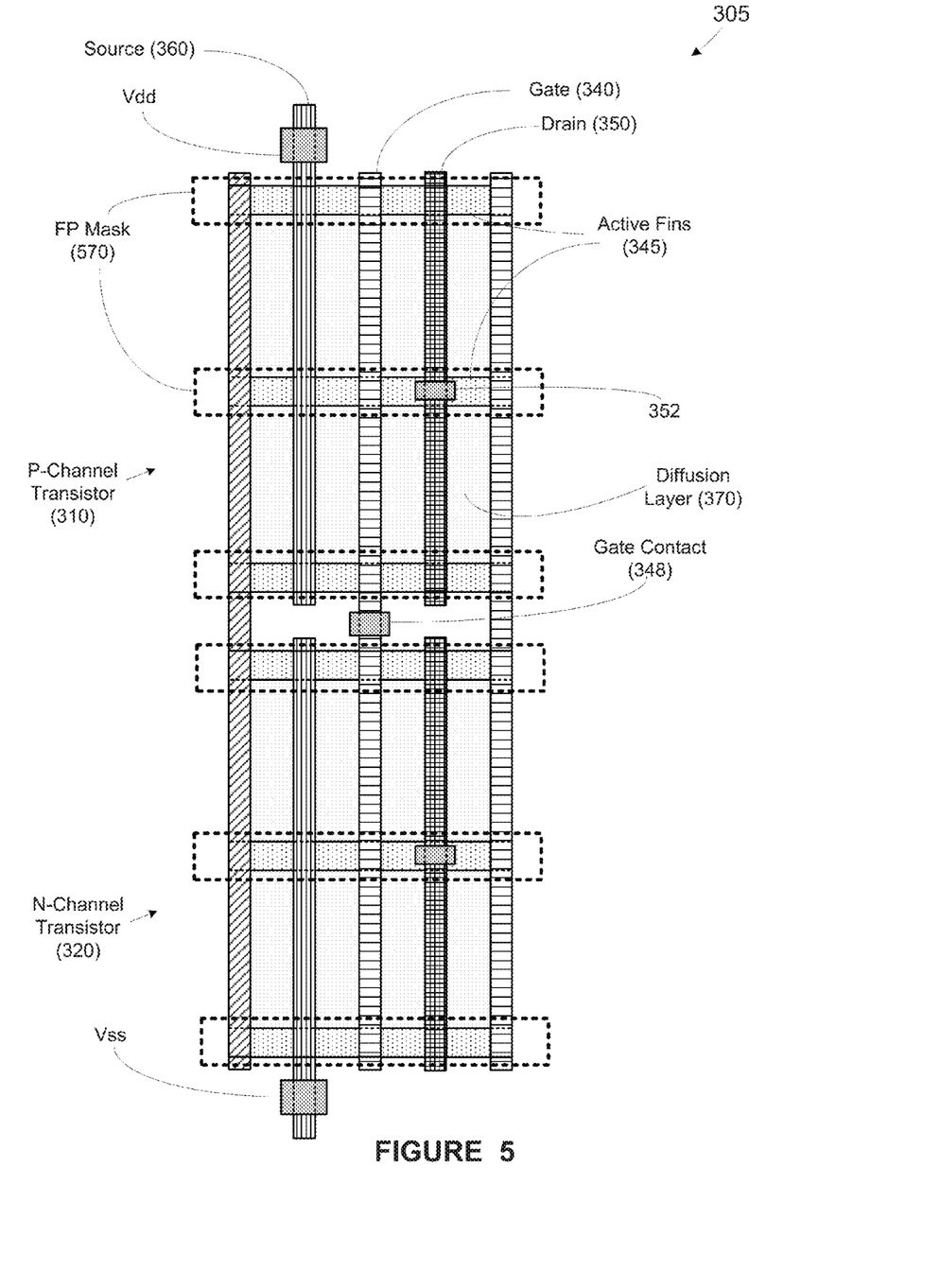
FIG. 5 illustrates a stylized diagram of a layout of a FinFET device comprising a reduced amount of fins, in accordance with a second embodiment.

FIG. 5 illustrates a stylized diagram of a layout of a FinFET device comprising a reduced amount of fins, in accordance with a second embodiment. Referring simultaneously to FIGS. 3, 4 and 5, FIG. 5 illustrates another modified set of FP mask shapes 570. In the example of FIG. 5, data from the design performance unit 240 may indicate that based on a state timing analysis, a larger excessive amount of time (i.e., timing slack) is available for meeting performance requirements, as compared to the example of FIG. 4. In this case, a determination may be made to reduce the number of active fins 345 from seven active fin 345 (FIG. 3) to 3 active fins 345 (FIG. 5). The reduction of the active fins is made in such a manner that three active fins 345 provide sufficient current drive capabilities to ensure sufficient performance.

In order to reduce the number of active fins from seven to three fins, three individual FP mask shapes 570 that are just large enough to preserve four fins are provided and the slotting of the FP masks and are spaced apart strategically. This allows four intermediary fins to be removed by during the fin patterning process. That is, the FP mask shape 345 of FIG. 3 is slotted in such a manner that only three active fins 345 are preserved in the fin patterning process. This selection of the number of fins to preserve during the fin patterning process is based upon calculations that show that only three active fins are required to provide sufficient current drive to meet predetermined performance requirements.

Figure 6:
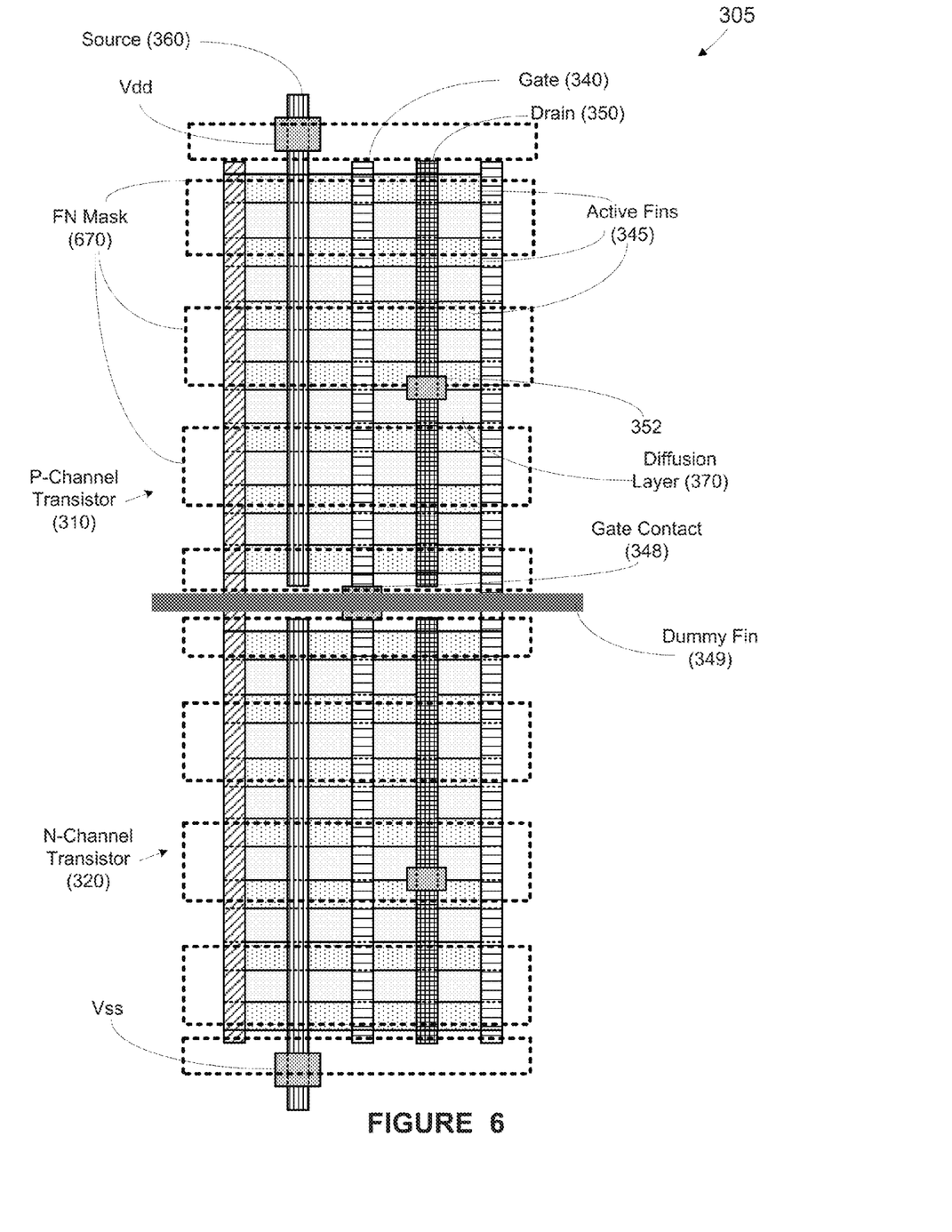
FIG. 6 illustrates a stylized diagram of an fin mandrel (FN) mask layout of a FinFET device.

Turning now to FIG. 6, a stylized diagram of an FN mask layout of a FinFET device is illustrated. The FinFET device 305 of FIG. 3 comprises a P-channel FinFET 310 and an N-channel FinFET 320. A mandrel lithography process may be manipulated to change the number of fins of the FinFET device 310. FIG. 6 illustrates that the FinFET device 310 comprises seven active fins 345. Similar to the description above with respect to FIG. 3-5, a timing analysis performed by the design performance unit 240 may indicate that a timing slack is present. As such, a determination may be made that the number of fins of the FinFET device 310 may be reduced while maintaining performance requirements.

FIG. 6 illustrates a plurality of FN mask shapes 670 that may be used to create mandrels in the fin patterning process. For example, three of the FN mask shapes 670 may be used to form six active fins 345, and a fourth FN mask shape 670 may be used to form the seventh active fin 345. In this manner, seven active fins 345 are designed in, or formed on the FinFET device 310.

FIG. 6 also illustrates a dummy fin 349. The dummy fin 349. The dummy fin 349 may provide a gap between active fins of the N-regions and the P-regions, as well as underneath the power rails. The dummy fin 349 may be provided to accommodate various other design elements while preventing shorting to the active fins 345. In one embodiment, the dummy fin 349 is generated, other design elements are added, and the dummy fin 349 is later removed in the fin manufacturing process. Moreover, in some embodiments, each mandrel used in the FN process step may create either two or four fins. In some examples, a dummy fin 349 may be provided such that during the process in which the fins are cut away, an odd number of active remain.

Figure 7:
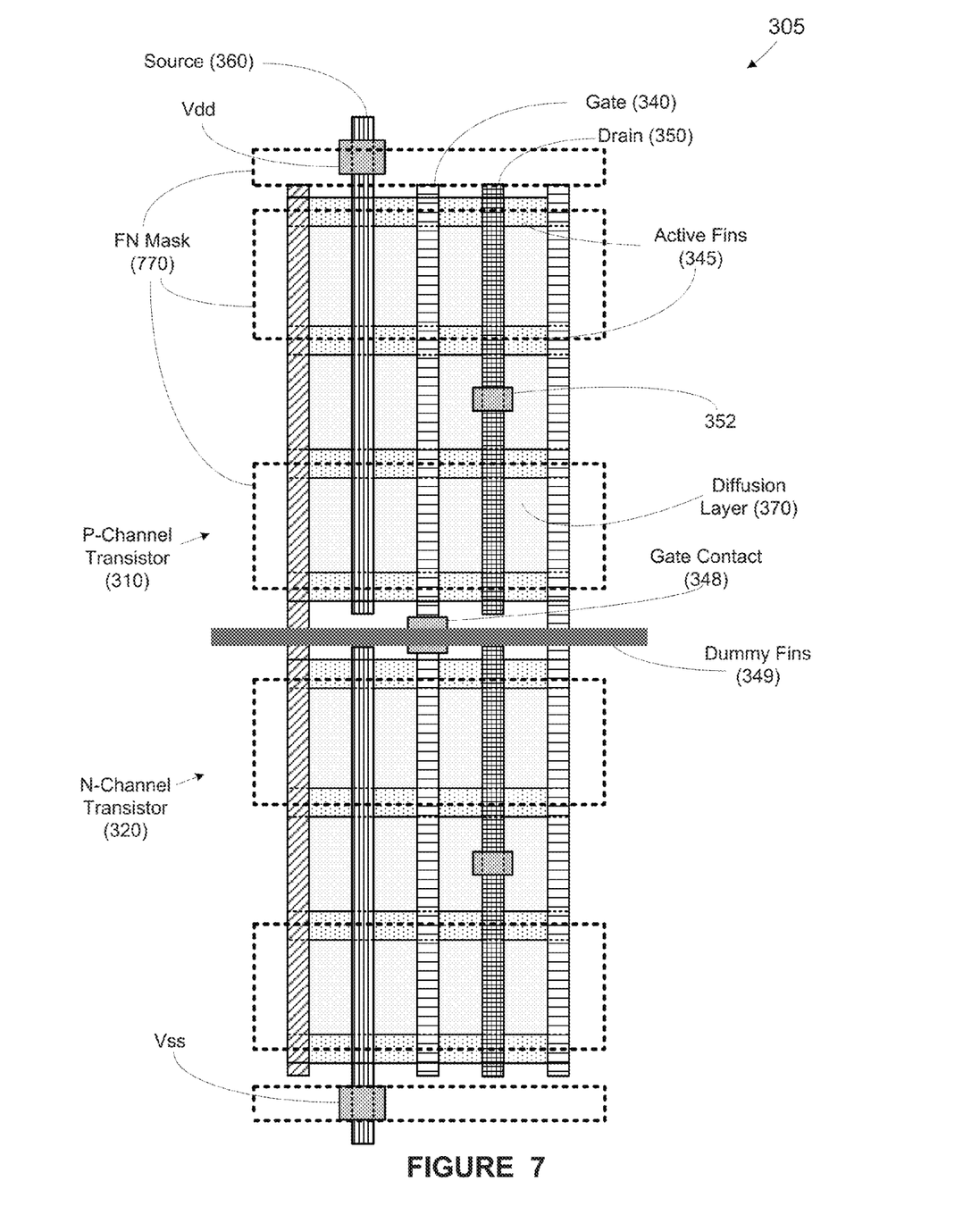
FIG. 7 illustrates a stylized diagram of a layout of a FinFET device comprising a reduced amount of fins, in accordance with a third embodiment.

FIG. 7 illustrates a stylized diagram of a layout of a FinFET device comprising a reduced amount of fins, in accordance with a third embodiment. Referring simultaneously to FIGS. 6 and 7, the number of active fins 345 may be reduced from seven to four. Based upon the performance and timing slack feedback described herein, the number of active fins 345 in FIG. 7 is reduced to four. In one embodiment, the FN mask 670 may be modified to change the mandrel size within the cell being processed. The FN masks 770 are modified from the FN mask shapes 670 of FIG. 6 in a manner that the mandrel size is changed. Changing the mandrel size within the cell increases the distance between the active fins 345. This effectively provides for a smaller number of active fins with the cell. Therefore, based upon the modified FN mask 770, the mandrel lithography process may yield four active fins 345. FIG. 7 also illustrates a dummy fin 349 provided for the reasons described above. The dummy fin 349 may be removed during the fin manufacturing process.

Figure 8:
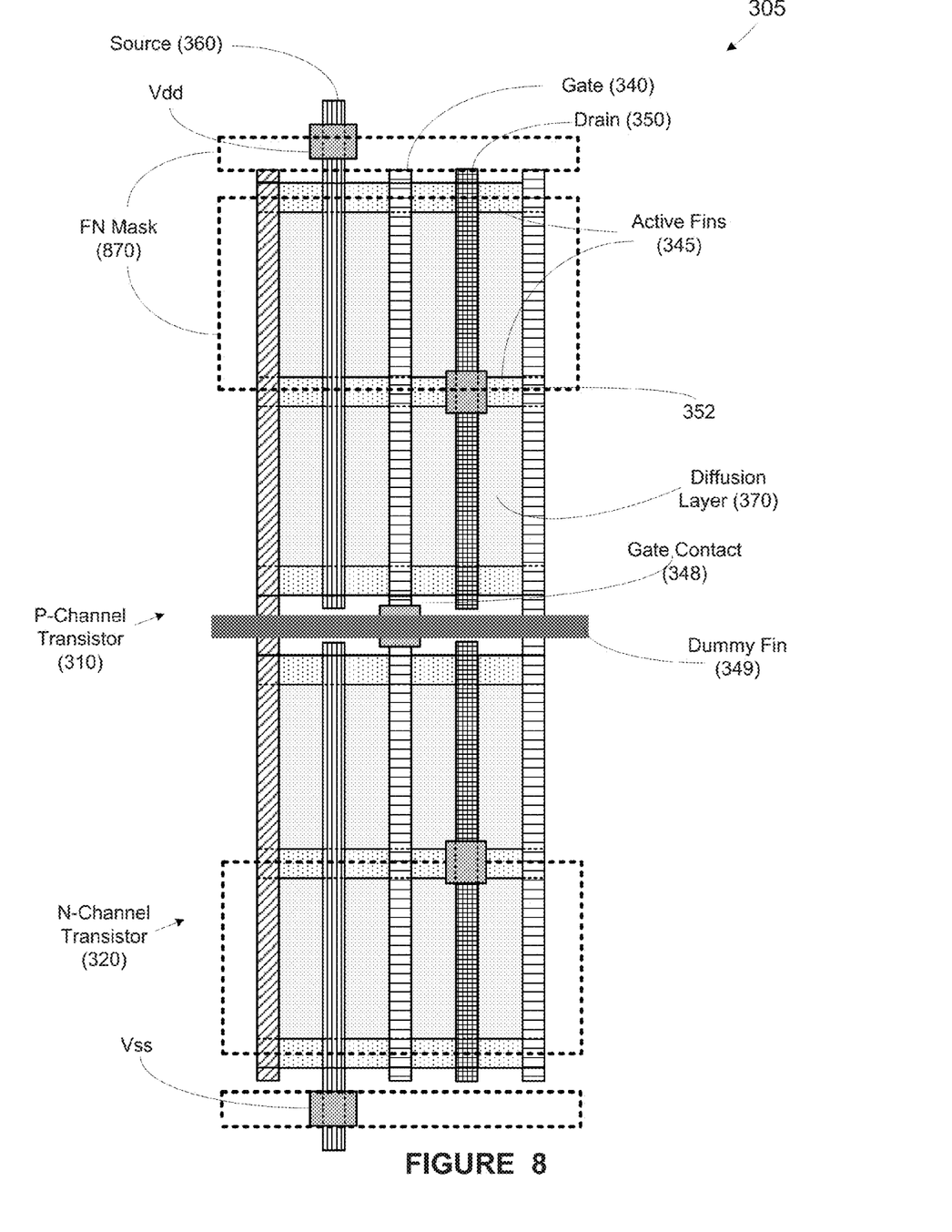
FIG. 8 illustrates a stylized diagram of a layout of a FinFET device comprising a reduced amount of fins, in accordance with a fourth embodiment.

FIG. 8 illustrates a stylized diagram of a layout of a FinFET device comprising a reduced amount of fins, in accordance with a fourth embodiment. Referring simultaneously to FIGS. 6, 7 and 8, the number of active fins 345 may be reduced from seven to three. In response to the feedback with respect to the timing slack, the number of active fins 345 in FIG. 8 is reduced to three. The FN mask shapes 870 are modified from the FN mask shapes 670 of FIG. 6 in a manner that the mandrel size is changed. Changing the mandrel size as exemplified in FIG. 8 further increases the distance between the active fins 345, as compared to the example of FIG. 7. This effectively provides for an even smaller number of active fins with the cell. Accordingly, utilizing the modified FN mask 870, the mandrel lithography process may yield three active fins 345. Moreover, the modification of the FN masks 770, 870 to reduce the number of active fins 345 may be made without changing the FP mask used to form the device 305. Therefore, the number of fins of FinFET device may be changed in the design phase without affecting the layout of other components in the design. FIG. 8 also illustrates a dummy fin 349 provided for the reasons described above. The dummy fin 349 may be removed during the fin manufacturing process. Further, changes to manufactured device may be by modifying the FP mask or the FN mask of a process without affecting the layout of other components in the design.

Figure 9:
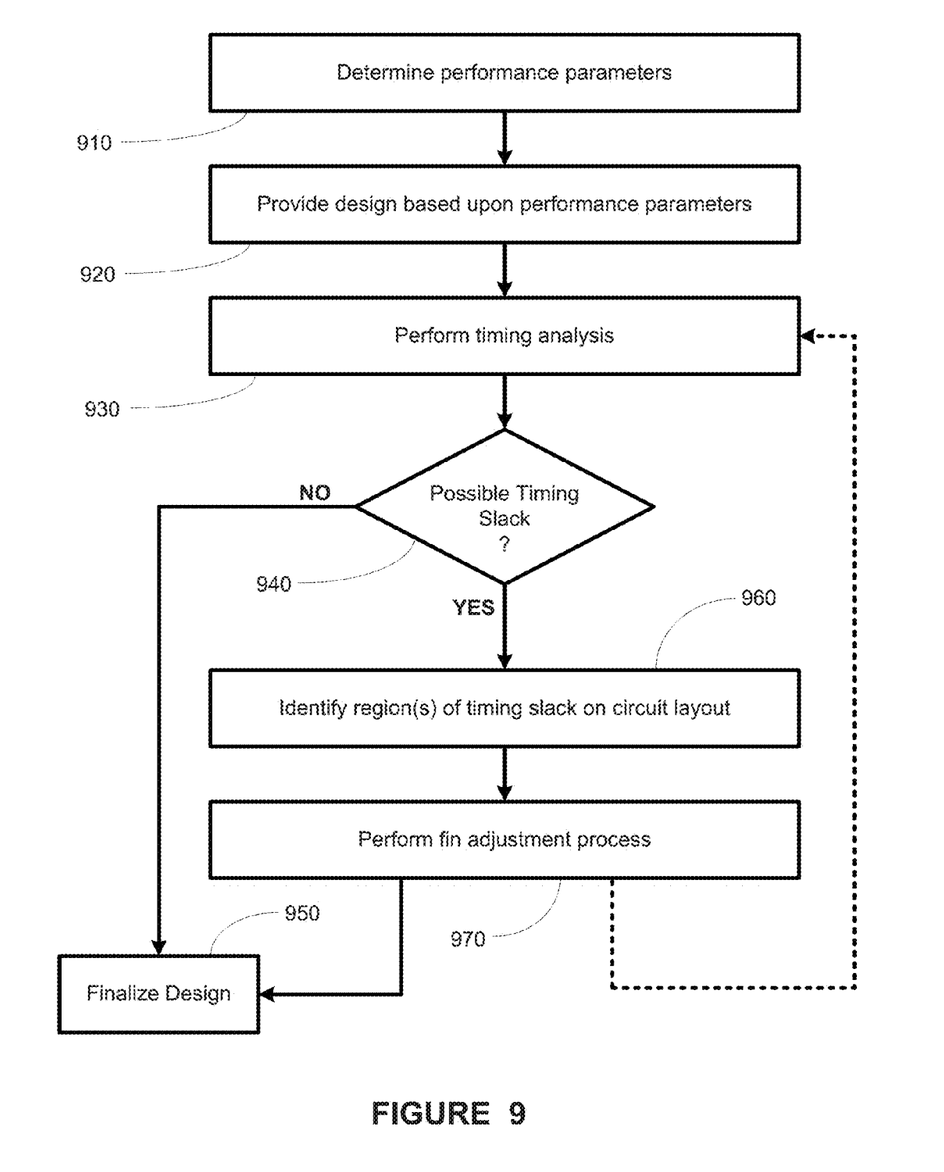
FIG. 9 illustrates a flowchart depiction of performing a power reduction process of a design of a semiconductor device in accordance with an embodiment.

Turning now to FIG. 9, a flowchart depiction of performing a power reduction process of a design of a semiconductor device in accordance with an embodiment, is illustrated. In one embodiment, the desired performance parameters for an integrated circuit device are determined (block 910). The performance parameters may comprise various factors, such as clock rates, data transmission rates, drive currents, various timing constraints, power consumption parameters, etc. Based upon the performance parameters, a design of the semiconductor device may be provided (block 920). In another embodiment, one or more semiconductor devices may be manufactured based upon the design. The design may comprise specific amounts of drive capabilities of various components of the device, such as FinFET devices. Based upon the drive capabilities, a predetermined number of fins of the FinFET devices may be designed into the circuitry of the semiconductor device. In some cases, the number of fins that are designed into the FinFET devices may later prove to be excessive.

A timing analysis of the simulation-operation of the semiconductor device design may be performed (block 930). For example, a static timing analysis may be performed to analyze various timing paths in the circuitry of the semiconductor design. In an alternative embodiment, the timing analysis may be performed on one or more manufactured devices. The device performance unit 240 may perform various timing analyses. Upon performing the timing analysis, a determination is made as to whether a timing slack is found (block 940).

In the event that a timing slack is not found, the design may be finalized (block 950). In this case, eliminating one or more fins of FinFET devices is made more difficult since excess drive capabilities were not found. That is, the number of fins that were mandated into the design are generally needed to meet timing requirements. However, in the event that a timing slack is found, one or more regions of the circuitry in the semiconductor device that relate to the timing slack may be identified (block 960). Upon identifying the region related to the timing slack, a fin adjustment process may be performed (block 970). The fin adjustment process may comprise determining the acceptable current drive capability of a FinFET device, which is followed by determining the number of fins that may be eliminated from the design while maintaining current drive capability needed for meeting timing requirements. Further, this process may include determining the method of adjusting/modifying the number of fins of a FinFET device, e.g., determining whether to use a modified FP mask, a modified FN mask, or other process adjustments known to those skilled in the art having benefit of the present disclosure.

Upon performing the fin adjustment process, the design may be finalized (the flow from block 970 to block 950). In an alternative embodiment, upon performing the fin adjustment process, the timing analysis may again be performed, followed by the a check to determine any further timing slack to make further fin count adjustments (the flow from block 970 to 930). The modified design may then be forwarded, or fed-back, to a process controller 220 for modification of semiconductor device processing according to the finalized design. In some embodiments, upon finalizing the design by modifying a mask (e.g., an FP mask, an FN mask, etc.), the modified mask may be sent to a mask manufacturer. The manufactured mask may then be used to manufacture integrated circuit devices comprising FinFET devices that comply with the modified design.

Figure 10:
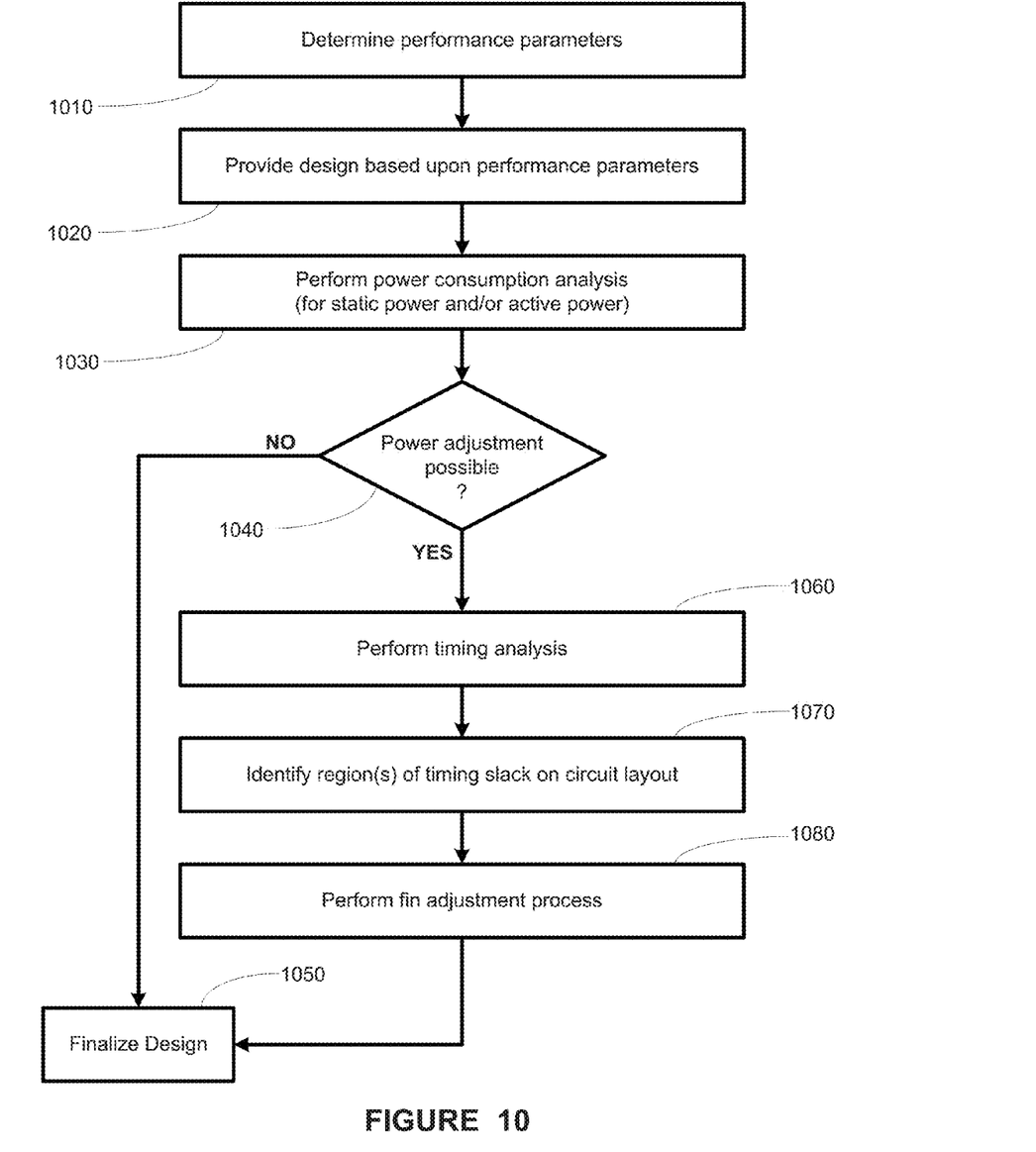
FIG. 10 illustrates a flowchart depiction of performing a power reduction process of a design of a semiconductor device in accordance with an alternative embodiment.

Turning now to FIG. 10, a flowchart depiction of performing a power reduction process of a design of a semiconductor device in accordance with an alternative embodiment, is illustrated. Similar to the flow exemplified in FIG. 9, the desired performance parameters for an integrated circuit device is determined (block 1010). Based upon the performance parameters, a design of the semiconductor device may be provided (block 1020). Subsequently, a power consumption analysis may be performed (block 1030). For example, a static power consumption analysis and/or an active power consumption analysis may be performed. The static and/or the active power consumption analysis may provide information as to whether power-saving steps should be taken. Accordingly, a determination may then be made as to whether a power adjustment process is possible (block 1040). If a power adjustment process is not possible, the design may be finalized (block 1050).

In the event that it is determined that a power adjustment process is possible, a timing analysis (e.g., static timing analysis) a may be performed (block 1060). This timing analysis may be based upon simulation data and/or test data from testing a semiconductor device.

A timing analysis of the simulation-operation of the semiconductor device design may be performed. For example, a static timing analysis may be performed to analyze various timing paths in the circuitry of the semiconductor design. In an alternative embodiment, the timing analysis may be performed on or more manufactured devices. Based upon the timing analysis, one or more regions of the circuitry in the semiconductor device that relates to any timing slack may be identified (block 1070). Upon identifying the region related to the timing slack, a fin adjustment process is performed (block 1080). The system 200 may be capable of performing analysis and design adjustments for various products involving various technologies. For example, the system 200 may provide test data for CMOS technology, Flash technology, BiCMOS technology, power devices, memory devices (e.g., DRAM devices), NAND memory devices, power devices, and/or various other semiconductor technologies.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   providing a first design comprising a process mask definition, a FinFET device that comprises a plurality of fins characterized by said process mask, and a timing requirement relating to an operation of said FinFET device;
   determining a timing parameter of said operation of said FinFET device;
   determining, based upon said timing parameter, whether a drive capability of said FinFET device is above a level required to maintain said timing requirement; and
   modifying said process mask for reducing at least one of said fins in response to said determining that said drive capability is above said level required to maintain said timing requirement.

2. The method of claim 1, further comprising:
   identifying a first fin for removal based upon said determining that said drive capability is above said level required to maintain said timing requirement;
   providing a second design by modifying said process mask in a manner that said first fin will be removed upon performing of said process step; and
   performing a process step using said second design to reduce said at least one fin.

3. The method of claim 1, wherein determining said timing parameter of an operation of said FinFET device comprises performing a static timing analysis for determining a timing slack associated with said operation of said FinFET device.

4. The method of claim 3, wherein determining whether a drive capability of said FinFET device is above said level required to maintain said timing requirement comprises determining whether the drive capability relating to said operation of said FinFET device exceeds said a minimum level drive capability for said timing slack.

5. The method of claim 4, wherein modifying said process mask for reducing at least one of said fins comprises identifying a first fin for removal for reducing said timing slack.

6. The method of claim 1, wherein modifying said process mask for reducing at least one of said fins comprises slotting an FP mask for removing said first fin.

7. The method of claim 1, wherein modifying said process mask for reducing at least one of said fins comprises modifying an FN mask for removing said first fin during a patterning process.

8. The method of claim 7, wherein performing a process step using said process mask comprises performing a mandrel lithography process.

9. The method of claim 7, wherein modifying said process mask for reducing at least one of said fins comprises changing the mandrel size for increasing the distance between at least two of said plurality of fins.

10. The method of claim 1, further comprising providing data relating to said adjusted process mask a mask manufacturer.

11. The method of claim 10, further comprising manufacturing integrated circuit products using masks obtained from said mask manufacturer, wherein said masks were based upon said data relating to said adjusted process mask.

12. The method of claim 1, wherein determining, based upon said timing parameter, whether said drive capability of said FinFET device is above said level required to maintain said timing requirement comprises performing at least one of:
   performing a simulation of said design; or
   performing a testing of an integrated circuit manufactured based upon said design.

13. The method of claim 1, wherein modifying said process mask further comprises modifying only one of a plurality of process masks for changing at least one power characteristic and at least one performance characteristic of said FinFET device.

14. A system, comprising:
   a semiconductor device processing system to manufacture a semiconductor device;
   a processing controller operatively coupled to said semiconductor device processing system, said processing controller configured to control an operation of said semiconductor device processing system; and
   a design unit configured to:
   generate a first design comprising a definition for a process mask, a definition for an operation of a FinFET device that comprises a plurality of fins, and a definition of a timing requirement relating to said operation;
   perform an operational analysis of said first design to determine a timing parameter of said operation;
   determine, based upon said timing parameter, whether the number of fins is excessive; and
   provide a second design by modifying said process mask for reducing said number of fins in response to determining that said number of fins is excessive; and
   wherein said semiconductor device processing system is adapted to perform a process step using second design.

15. The system of claim 14, wherein said processing controller is configured to modify at least one process parameter based upon data relating adjusted process mask.

16. The system of claim 14, wherein said design unit comprises:
   a design system for providing said first design;
   a simulation unit for simulating said first design;
   a testing unit to test a semiconductor device manufactured using said first design;
   a power consumption unit to determine said drive capability; and
   a timing unit to determine a timing slack associated with said operation of said FinFET device based upon data from at least one of said simulation unit or said testing unit.

17. The system of claim 14, wherein said design unit is further capable of determining whether a drive capability relating to said operation of said FinFET device exceeds said a minimum level drive capability for a timing slack relating to said operation.

18. An apparatus, comprising:

a design unit comprising:

a design system adapted to provide a first design comprising a FinFET device that comprises a plurality of fins, said first design comprising a timing requirement relating to an operation of said FinFET device;

a simulation unit adapted to determine a timing parameter of said operation of said FinFET device based upon said timing requirement; and a power consumption unit adapted to determine, based upon said timing parameter, whether a drive capability of said FinFET device is above a level required to maintain said timing requirement; and wherein said design system is further adapted to adjust a process mask for reducing at least one of said fins in response to said determining that said drive capability is above said level required to maintain said timing requirement.

19. The apparatus of claim 18, wherein said design unit is further adapted to:

identify a first fin for removal based upon said determining that said drive capability is above said level required to maintain said timing requirement; and adjust said process mask in a manner that said first fin will be removed upon performing of said process step.

20. The apparatus of claim 18, wherein said process mask is one of an Fin mandrel (FN) mask or an Fin cut (FP) mask.

* * * * *